(12) United States Patent
Faisy

(10) Patent No.: US 7,363,056 B2
(45) Date of Patent: Apr. 22, 2008

(54) METHOD AND SYSTEM FOR SECURED DUPLICATION OF INFORMATION FROM A SIM CARD TO AT LEAST ONE COMMUNICATING OBJECT

(75) Inventor: Christian Faisy, Saint Denis de la Reunion (FR)

(73) Assignee: Societe Francaise du Radiotelephone, Paris (FR)

( * ) Notice: Subject to any disclaimer, the term of this patent is extended or adjusted under 35 U.S.C. 154(b) by 490 days.

(21) Appl. No.: 11/140,536

(22) Filed: May 27, 2005

(65) Prior Publication Data

US 2005/0282584 A1  Dec. 22, 2005

(30) Foreign Application Priority Data

May 27, 2004  (FR) .................................. 04 05735

(51) Int. Cl.
    *H04B 1/38* (2006.01)
(52) U.S. Cl. .................. 455/558; 455/410; 455/419
(58) Field of Classification Search ........... 455/410, 455/414.1, 418, 419, 420, 433, 550.1, 558
See application file for complete search history.

(56) References Cited

U.S. PATENT DOCUMENTS

| | | | |
|---|---|---|---|
| 6,014,561 A * | 1/2000 | Molne ......................... 455/419 |
| 6,427,073 B1 * | 7/2002 | Kortesalmi et al. ...... 455/414.1 |
| 6,836,670 B2 * | 12/2004 | Castrogiovanni et al. ... 455/558 |
| 6,980,830 B2 * | 12/2005 | Ahonen ....................... 455/558 |

* cited by examiner

*Primary Examiner*—Quochien B. Vuong

(57) ABSTRACT

The present invention relates to a method and system for secured duplication of at least part of the information form a SIM card, by a mobile equipment, at least one operator equipment and at least one communicating object, connected to each other via a wireless telephone network and/or via a wireless local link and further applying the following steps:

- sending by the mobile equipment to operator equipment, a request for cloning an IMSI associated with its SIM card,
- authentication by the operator equipment, of the IMSI of the mobile equipment and of the IMEI of the communicating object, then generation of an IMSI clone,
- recording the data from the SIM card into the storage means of the communicating object.

24 Claims, 3 Drawing Sheets

METHOD AND SYSTEM FOR SECURED DUPLICATION OF INFORMATION FROM A SIM CARD TO AT LEAST ONE COMMUNICATING OBJECT

CROSS-REFERENCE TO RELATED APPLICATIONS

This application claims priority from French Patent Application No. 04 05735, filed on May 27, 2004.

The present invention relates to the field of communications and in particular to that of mobile telephony. The invention more specifically relates to a method and system for applying the method, allowing a subscription subscriber to use different communicating objects, while physically having only one SIM (Subscriber Identity Module) card.

Mobile phone networks operate through operators which provide phone access to their subscription subscribers, whose identity (IMSI), International Mobile Subscriber Identity), directory number and profile are recorded in a nominal localization register (HLR, Home Location Register) of the operator and in authentication centers. The subscriber has a mobile equipment identified by a serial number (IMEI, International mobile Equipment Identity) and containing a SIM card in which the IMSI of the subscription subscriber is further stored. When the subscription subscriber uses the network of the operator, the IMSI stored in the SIM card of the subscriber is sent, by his/her mobile equipment, to an authentication center, in order to check the validity of the IMSI, and to an HLR database of the operator, for checking the profile and the status of the subscriber's subscription. Operation of the mobile equipment Is conditioned by the input of a secret code associated with the SIM card. With the SIM cards, it is therefore possible to make the use secure of subscriptions as subscribed by the users of the operator's network, by means of an authentication at the level of the mobile equipment and at the level of the network. The communications made by the subscriber of the subscription may thereby be counted and billed to this subscriber. However, this operation requires that the subscribers use their SIM card in compatible mobile equipment in order to use their subscription. If they wish to use mobile equipment different from their own, they have to extract the SIM card from their mobile equipment in order to place it in another communicating object, provided that the latter operates with the SIM card. If a subscription subscriber wishes to have the possibility of using several objects communicating at the same time, he/she will have to ask his/her operator for several "twin" SIM cards. The IMSIs associated with each of the SIM cards will have to be linked to the subscription of the subscriber, who will have to have as many SIM cards as there are communicating objects. These solutions therefore have the drawbacks of being costly and not very practical to apply, both for the operators and the subscribers of subscriptions.

A first object of the present invention is to suppress certain drawbacks of the prior art by proposing a secured method for duplicating information from a SIM card to at least one communicating object, so that a subscription subscriber may use at least one communicating object distinct from his/her mobile equipment.

This object is achieved by a secured method for secured duplication of at least part of the information from a SIM card to at least one communicating object which is in communication with a mobile equipment via a wireless local link, characterized in that it is implemented by a mobile equipment, at least one operator equipment and at least one communicating object, connected to each other via a wireless telephone network and/or via a wireless local link and in that it includes the following steps:

mutual identification between the mobile equipment and the communicating object, then sending, in an encrypted form, the IMEI serial number stored in storage means of the communicating object, by processing means of the communicating object, to processing means of the mobile equipment, receiving the IMEI of the communicating object by the mobile equipment, then sending, to the processing means of at least one operator equipment, by the processing means of the mobile equipment, a request for cloning a template IMSI associated with the SIM card of the mobile equipment, accompanied by the IMEI, in an encrypted form, of the communicating object to which the data should be assigned, receiving the cloning request by the processing means of the operator equipment, which perform, by consulting storage means of operator equipment, authentication of the received template IMSI and authentication of the IMEI of the communicating object.

According to another feature, following the steps for authenticating the template IMSI of the mobile equipment and authenticating the encrypted IMEI of the communicating object, when at least one identifier, among IMSI and IMEI, is not authenticated, the processing means of the operator equipment perform a step for sending a message for refusing the cloning to the processing means of the mobile equipment which then suggest to the subscription subscriber, going back to the mutual identification step between the mobile equipment and the communicating object.

According to another feature, following the steps for authenticating the template IMSI of the mobile equipment and authenticating the encrypted IMEI of the communicating object, when IMSI and IMEI are both authenticated, the method continues with the following steps:

generating, in the storage means of operator equipment, an IMSI clone with which are associated the IMEI of the communicating object and the template IMSI corresponding to the SIM card of the mobile equipment, then sending, to the mobile equipment, an authorization for copying the data from its SIM card into storage means of the communicating object.

receiving the authorization for copying the data by the mobile equipment, then copying and sending the data from the SIM card, by the processing means of the mobile equipment, to the processing means of the communicating object, receiving the data from the SIM card, by the processing means of the communicating object, then recording these data In storage means of the communicating object.

According to another feature, the method includes a preliminary step for obtaining consent from the operator, consisting of recording, in the storage means of at least one operator equipment, a plurality of virtual IMSIs, waiting to be assigned to a subscription of a subscriber on the one hand, and, on the other hand, a plurality of IMEI serial numbers corresponding to communicating objects notified by the manufacturers of communicating objects, authorized by the operator, and a decryption key common to all the notified communicating objects, the step for authenticating the IMEI of the communicating object consisting of decrypting the received IMEI, by means of the stored decryption key, and comparing it with the plurality of IMEIs stored in the storage means of operator equipment, the step for generating an IMSI clone, with which are associated the IMEI of the communicating object and the template IMSI, consisting of authenticating the template IMSI by consulting an authentication center, followed by checking the subscription profile associated with the template IMSI for determining whether the cloning is authorized, then, if need be, by assigning one of the virtual IMSIs as a clone of the template IMSI of the subscription subscriber in the storage means of operator equipment, then associating the IMEI of the authenticated communicating object with this virtual IMSI which has become a clone.

According to another feature, at least certain steps of the method may be controlled by the subscription subscriber, by input and display means, present in the mobile equipment and in the communicating object, providing interactivity of the subscription subscriber with a software application executed on the processing means of the mobile equipment and of the communicating object in order to provide their interoperability.

According to another feature, the step for mutual Identification between the mobile equipment and the communicating object is based on detection protocols between devices with wireless local link modules consisting of scanning the influence area of a master module for seeking slave modules and resulting in a detection of the communicating object by the mobile equipment, by respective wireless local link modules, in the slave and master modes, respectively, this detection being followed by sending, by the mobile equipment to the communicating object, a report request on the assignment status of the communicating object to a possible IMSI of a subscription subscriber.

According to another feature, following the mutual identification step between the mobile equipment and the communicating object, when the communicating object is assigned to an IMSI clone which does not correspond to the template IMSI stored in the mobile equipment, the software application of the mobile equipment suggests going back to the mutual Identification step between the mobile equipment and the communicating object, so as to prevent any change in this assignment from a mobile equipment which does not correspond to the template IMSI of the subscription subscriber to which the communicating object has been assigned beforehand.

According to another feature, following the mutual identification step between the mobile equipment and the communicating object, when the communicating object is assigned to an IMSI clone corresponding to the template IMSI stored in the mobile equipment, the software application of the mobile equipment suggests a step for detaching the IMSI clone from the communicating object, allowing deletion In the storage means of the communicating object, of the data copied from the SIM card of the subscription subscriber.

According to another feature, following the mutual identification step between the mobile equipment and the communicating object, when the communicating object is not assigned to any template IMSI, the software application suggests a step for confirming the assignment of an IMSI clone to the communicating object, this confirmation resulting, if need be, in the sending by the mobile equipment of a request for transmitting the IMEI of the communicating object, followed by an answer from the communicating object which performs the sending, in an encrypted form, of the IMEI stored in its storage means, to the mobile equipment.

According to another feature, the step for recording the data from the SIM card into the storage means of the communicating object is preceded by a possible step for deleting the data possibly stored in its storage means beforehand.

According to another feature, the steps for recording the data from the SIM card into the storage means of the communicating object and for assigning an IMSI clone to the communicating object, then allow the application of the standard steps for authenticating the communicating object on the network of the operator, for using the communications authorized by the subscription of the subscriber.

According to another feature, the method also Includes a step for updating the data relative to the IMSI clone in the storage means of the communicating object of the subscription subscriber, this updating consisting of, If need be, writing new data into the storage means of the communicating object, under the control of processing means of operator equipment, following the standard steps for authenticating the communicating object on the network of the operator, when using the communications authorized by the subscription of the subscriber.

According to another feature, the step for updating the data relative to the IMSI clone in the storage means of the communicating object of the subscription subscriber may also consist of writing new data into the storage means of the communicating object, under the control of the processing means of the mobile equipment of the subscription subscriber, following a new step for mutual identification between the mobile equipment and the communicating object, Initiated by the subscription subscriber.

A second object of the present invention is to suppress certain drawbacks of the prior art by proposing a secured system for duplicating information from a SIM card to at least one communicating object, allowing a subscription subscriber to use at least one communicating object distinct from his/her mobile equipment, without requiring a second SIM card for making the use of the communicating object, secure.

This object is achieved by a secured system for secured duplication of information from a SIM card to at least one communicating object, comprising a mobile equipment, connected to at least one operator equipment via a wireless telephone network and at least one communicating object connected to the mobile equipment via a wireless local link, by the presence, in these devices, of wireless telephone communications modules and of wireless local link communications modules, characterized in that the mobile equipment and the communicating object including means for storing a software application and processing means executing this application, which allow their interoperability and their interactivity with a subscription subscriber, the processing means of the communicating object allowing, upon receiving of an IMEI request sent by the mobile equipment, the encryption of the IMEI stored in its storage means, by an encryption key stored in its storage means, and the encrypted sending of this IMEI to the processing means of the mobile equipment, these processing means of the mobile equipment further allowing association of the encrypted IMEI of the communicating object and of the template IMSI, stored in the SIM card of the mobile equipment, into a request for cloning the data from the SIM card and the sending of this cloning request to operator equipment.

According to another feature, at least one operator equipment Includes storage means in which are stored in addition a plurality of IMEIs corresponding to communicating objects notified by the manufacturers of communicating objects and authorized by the operator, and a decryption key common to all the notified IMEIs, processing means of operator equipment allowing authentication of the IMEI of the communicating object, received from the mobile equipment requesting the cloning of the data of its SIM card on the one hand and, on the other hand, generation of an IMSI clone, corresponding to an assignment of a copy of the template IMSI of the mobile equipment to the communicating object, the IMEI of which has been received In association with the request for cloning the data of the SIM card of the mobile equipment.

According to another feature, the storage means of operator equipment include a plurality of virtual IMSIs, waiting to be assigned to a subscription of a subscriber, processing means of the operator equipment allowing generation of an IMSI clone, during a request for cloning the data of the SIM card of a mobile equipment, corresponding to a transformation of one of these virtual IMSI into an IMSI clone, copied from the template IMSI of the requesting mobile equipment, on the one hand and, on the other hand to an association of the IMEI of the communicating object assigned to the IMSI clone.

According to another feature, the processing means of the mobile equipment and of the communicating object authorize control of the storage means of the communicating object by the mobile equipment and allow the recording of a copy of the data from the SIM card of the mobile equipment into storage means of the communicating object.

According to another feature, the processing means of operator equipment perform the checking of the integrity of the IMEI received from the mobile equipment requesting the cloning of the data of its SIM card in a communicating object identified by this IMEI, by decryption means of this received IMEI, by the decryption key stored in the storage means of operator equipment, on the one hand and, on the other hand, by means for comparing this decrypted IMEI with the plurality of IMEIs stored in the storage means of at least one operator equipment.

According to another feature, the processing means of at least one operator equipment include means for automatically performing the update of the data relative to the IMSI clone, in the case of a change in the data of the SIM card of the mobile equipment and means for directly recording the new data. via a wireless telephone network, into the storage means of the communicating object, by the processing means of the communicating object which authorize this recording.

According to another feature, the processing means of the mobile equipment include means for automatically performing the update of the data relative to the IMSI clone, in the case of a change in the data of the SIM card of the mobile equipment and means for directly recording the new data, via a wireless telephone network or via a wireless local link, into the storage means of the communicating object, by the processing means of the communicating object which authorize this recording.

According to another feature, the processing means of the communicating object to which an IMSI clone has been assigned, execute an application allowing the use of the subscription of the subscriber, from the data recorded in its storage means.

According to another feature, the plurality of IMEIs stored in the storage means of operator equipment is associated with information allowing the handling of the IMEIs of stolen or lost communicating objects and the processing means of at least one operator equipment forbid, if need be, any association of an IMEI notified as stolen or lost with an IMSI clone required by a mobile equipment.

According to another feature, the wireless local link communications modules, present In the mobile equipment, the communicating object and operator equipment, are Bluetooth® transceiver modules.

According to another feature, the wireless telephone network communications modules, present in the mobile equipment, the communicating object and the operator equipment, are compatible with the GSM/DCS and UMTS networks.

Other features and advantages of the present invention will become more apparent upon reading the description hereafter, made with reference to the appended drawings wherein.

Figure 1:
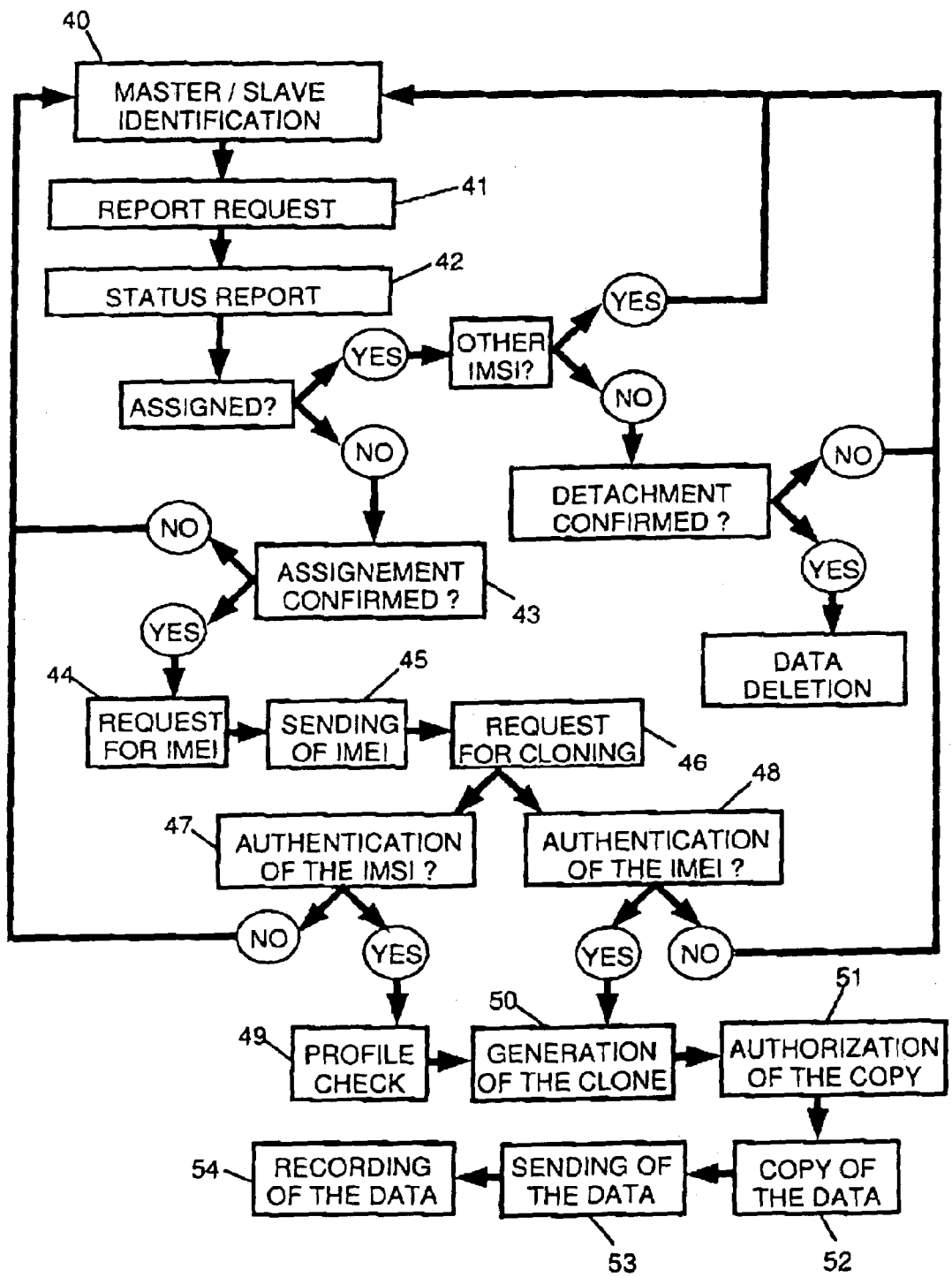
FIG. 1 illustrates a diagram of the steps of the method according to the invention.
Figure 2:
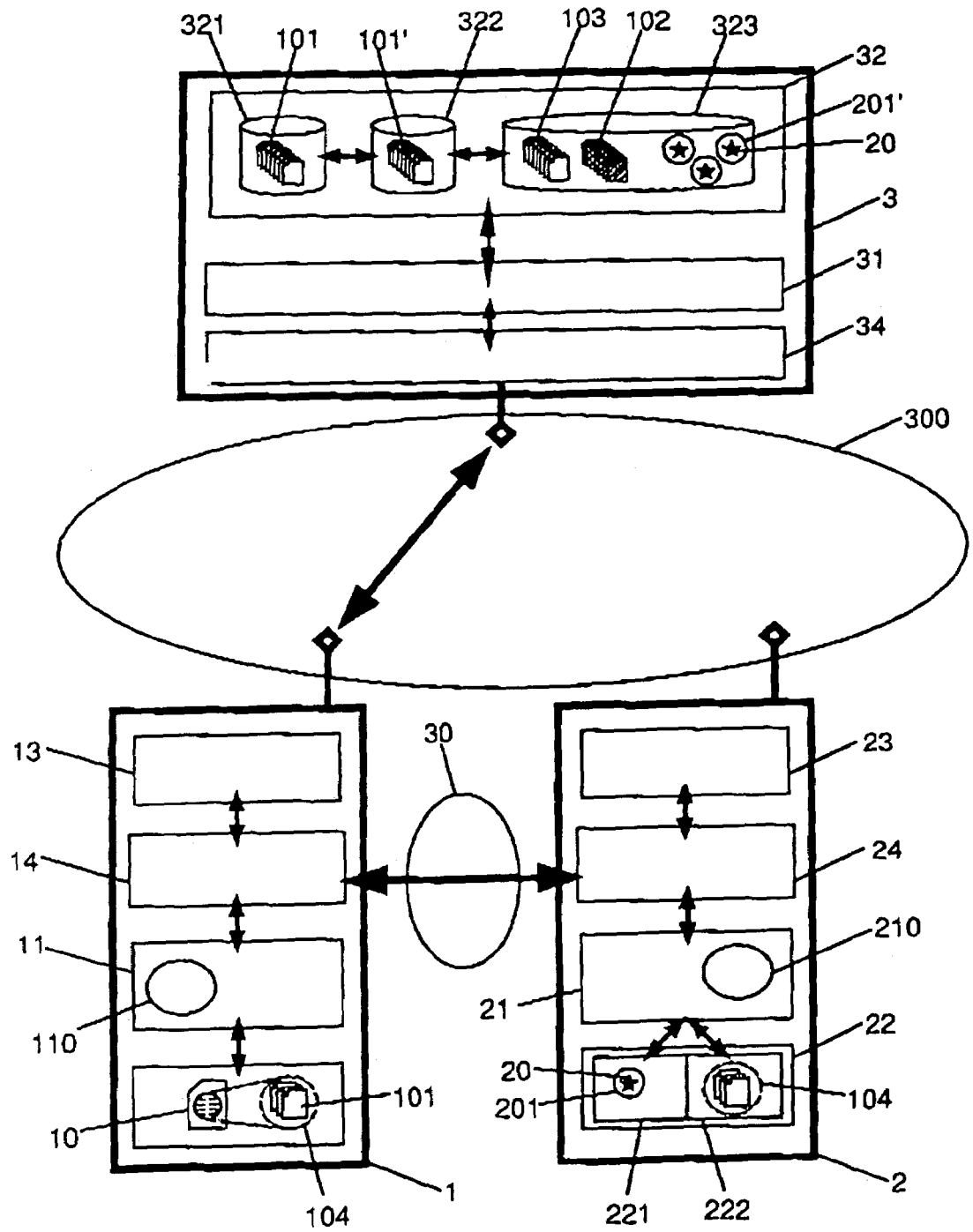
FIG. 2 illustrates a diagram of the system according to the invention.
Figure 3:
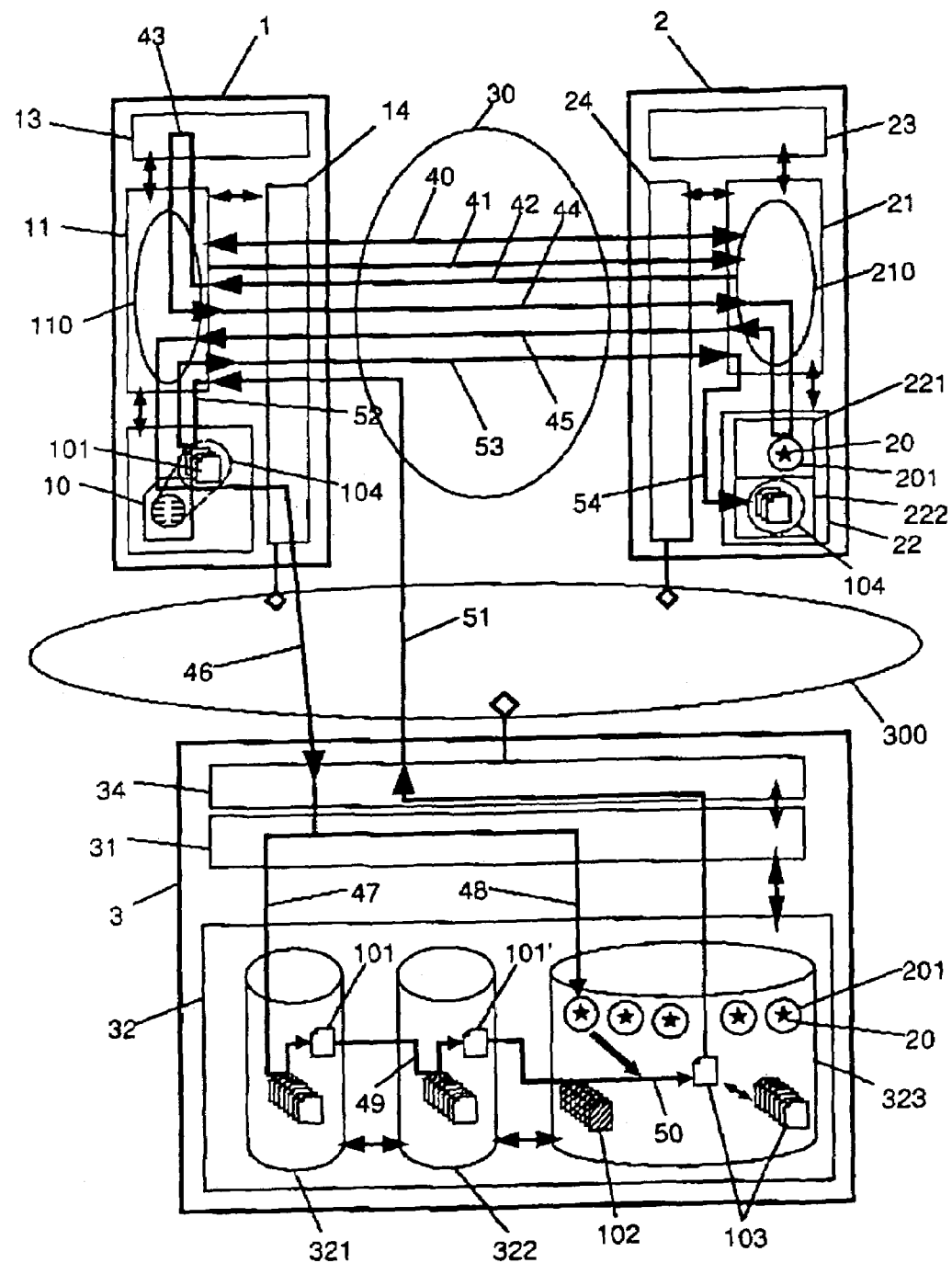
FIG. 3 illustrates a diagram of the steps of the method according to the invention, as applied by the system according to the invention.

The invention relates to a secured method for duplicating at least one part of the information (104) from a SIM card (10) to at least one communicating object (2). The invention also relates to a system for applying this method. The system according to the invention consists of a mobile equipment (1), for example a mobile phone, at least one communicating object (2), for example one or more mobile phones or else one or more PDAs (Personal Digital Assistant) and at least one operator equipment (3). Under the term of operator equipment (3), the whole equipment (authentication center, nominal localization register, etc.) of a given operator will be considered, allowing identification and connection of mobile phones in their Influence areas. For reasons of simplicity, it will be considered that this is a single terminal, although it Is obvious that it actually is a network consisting of several equipments communicating with each other. The networks of the operators are organized in relays, with central terminals In which databases allow identification of mobile phones requesting a connection. As explained earlier, certain databases present in authentication centers (321) allow the validity of the IMSIs. (101) communicated by the mobile phones, to be checked. Other databases present in HLR terminals (322) allow the profile (101') of the subscription of different subscribers of the telephone operator in communication with the network, to be stored. The profile (101') here corresponds to the whole of the services subscribed by a subscriber identified by an IMSI (101). The system according to the invention includes an extra database (323) for storing a plurality of IMEIs (20) for example corresponding to serial numbers of communicating objects, for example mobile phones, notified by the manufacturers and authorized by the operator. This database (323) may then be used for handling lost or stolen communicating objects and allows the operator to forbid the use of a device notified as lost or stolen. This database (323) also allows the storage of a plurality of virtual IMSIs (102), waiting to be assigned to a subscription, as described hereafter. The operator equipment (3) according to the invention therefore includes specific storage means (32) and specific processing means (31), for handling the information stored and sent to the mobile equipments requesting the application of the method according to the invention.

Application of the method according to the invention requires a preliminary agreement with the operator who will organize a network of terminals allowing different steps such as the authentication of the IMSIs (101) and the IMEIs (20) of the mobile equipments (1), or the generation of IMSI clones (103) in the databases (323) as explained hereafter.

This agreement with the operator will mainly consist of recording In a database (323), stored in the storage means (32) of at least one operator equipment (3), a plurality of virtual IMSIs (102), wafting to be assigned to a subscription of a subscriber, on the one hand, and, on the other hand, a plurality of serial numbers IMEI (20), corresponding to communicating objects (2) notified by the manufacturers of communication objects and authorized by the operator, as well as a decryption key (201') common to all the IMEIs of the notified objects. It will be noted that it is known from the prior art that the sending of sensitive information, such as authentication codes or serial numbers, over a network, is frequently performed under an encrypted form. No detail will be given on the encryption of the IMEI, on their encryption keys and the decryption key. Moreover, it is obvious that decryption may be achieved by means of a plurality of decryption keys (instead of a single common key), each being associated with an encryption key, for example by means of an identifier.

The method and the system according to the invention, for example, allow a subscription subscriber to perform secured duplication of information (104) stored in the SIM card (10) of his/her mobile telephone into another telephone. Thus, the subscription subscriber may use all the services to which he/she has subscribed, on several different devices, while only having a single subscription and a single SIM card (10). In the same way, several persons may benefit from the services of a single subscription on different devices at the same time. The information (104) stored in the SIM card (10) relates to the IMSI (101) associated with the subscribed subscription but also to different Information such as telephone directories for example. No detail will be given on this information and it is obvious that the method and system according to the invention allow duplication of the whole or a part of this information, according to the choice of the subscriber.

In the embodiment described here, duplication of the data (104) stored in the SIM card (10) is performed by having the mobile equipment (1) of the subscriber communicate with a communicating object (2) via a wireless local link (30), for example of the Bluetooth® type on the one hand and on the other hand by having the mobile equipment (1) of the subscriber communicate with the operator equipment, via a wireless telephone network, for example of the GSM/DCS or UMTS type. It is obvious that the method and system according to the invention allow other embodiments, at least with respect to the type of communications used between the constitutive devices of the system.

When the subscription subscriber wishes to make a secured duplication of Information of his/her SIM card (10), he/she initiates the steps of the method by means of his/her mobile equipment (1), the processing means (11) of which execute a software application (110), providing interoperability of the mobile equipment (1) with the operator equipment (3) and the communicating object (2) onto which the data should be duplicated. The processing means (21) of the communicating object (2) execute a similar software application (210). Also, the processing means (31) of the operator equipment (3) are adapted so as to allow a dialogue with the application (110) executed on the processing means (11) of the mobile equipment (1). This application (110) of the mobile equipment (1) also allows a subscriber to control certain steps of the method, by means of interactivity with the help of input and display means (13), present in the mobile equipment (1). For example, by selecting a specific menu, the subscriber launches the application (110) which initiates the first step of the method, allowing mutual identification (40) of the mobile equipment (1) and the communicating object (2). This step for mutual identification (40) between the mobile equipment (1) and the communicating object (2) is based on the detection protocols between devices provided with wireless local link (30) modules (14, 24) of the Bluetooth® type, for example. According to these protocols, a device operates in the master mode and scans the influence area (30) transmitted by Its Bluetooth® transceiver module (14), In order to detect possible devices therein, also provided with a Bluetooth® transceiver module and operating in the slave mode. The master device controls the communications and operations performed by the slave device. The presence, in the communicating object (2) and the mobile equipment (1) of wireless local link (30) Bluetooth® modules (24, 14, respectively), in slave (24) and master (14) modes respectively, provides mutual identification (40) between both devices. When the subscriber initiates the steps of the method on the mobile equipment. (1), the latter automatically switches to the master mode for detecting a communicating object (2), which will have been parameterized beforehand so as to operate in the slave mode, through input and display means (23) for example. This detection (40) of the communicating object (2) by the mobile equipment (1) results in the sending, by the mobile equipment (1) to the communicating object (2), of a report request (41) on the assignment status of the communicating object (2) to a possible IMSI of a subscription subscriber. The communicating object (2) then sends back a report (42) on its assignment status to a possible IMSI. If the communicating object (2) is already assigned to an IMSI clone (103) which does not correspond to the template IMSI (101) stored in the mobile equipment (1) of the subscription subscriber, the software application (110) of the mobile equipment, (1) suggests going back to the mutual identification (40) step between the mobile equipment (1) and a communicating object (2). In this way, any change in the assignments of the communicating object (2) is prevented from a mobile equipment (1), the IMSI (101) of which would not correspond to the one to which the communicating object (2) has been assigned beforehand. If the communicating object (2) is assigned to an IMSI clone (103) corresponding to the template IMSI (101) stored in the mobile equipment (1) of the subscription subscriber, the software application (110) suggests a step for detaching the IMSI clone (103) from the communicating object (2), allowing deletion in the storage means (22) of the communicating object (2), of the data (104) copied from the SIM card (10) of the subscription subscriber. If the communicating object (2) is not assigned to any template IMSI (101), the software application (110) suggests a step for confirming (43) assignment of an IMSI clone (103) to the communicating object (2). If the subscriber confirms this choice, his/her mobile equipment (1) sends a request (44) for transmitting the IMEI (20) of the communicating object (2). The communicating object (2) then answers by sending (45), in an encrypted form, the IMEI (20) stored in a non volatile memory (221), for example of the ROM type, in its storage means (22). Upon receiving the IMEI (20) of the communicating object (2), the processing means (11) of the mobile equipment (1) send, In an encrypted form, to the processing means (31) of operator equipment (3), a request (46) for cloning the data (104) stored in the SIM card (10) of the mobile equipment (1), accompanied by a template IMSI (101) associated with the SIM card (10) and the IMEI (20) of the communicating object (2) to which the data (104) should be assigned. Upon receiving the request (46) for cloning, by the processing means (31) of the operator equipment, consultation of storage means (32) of operator equipment (3) allows authentication (47) of the received template IMSI (101) and authentication (48) of the IMEI (20) of the communicating object (2). As introduced above, this consultation may consist of a dialog between the processing means (31) of operator equipment with remote databases (321, 322) for authenticating the received IMSI and IMEI. The step (48) for authenticating the IMEI (20) of the communicating object (2) may consist of decrypting, by means of the stored encryption key (201), the received IMEI (20) and of comparing it with the plurality of IMEIs (20) stored in the storage means (32) of operator equipment (3). The step for authenticating (47) the template IMSI is performed by consulting a database (321), or an authentication center, in order to check the validity of the received template IMSI (101). Next, the received template IMSI (101) allows checking (49) of the subscription profile (101') associated with the template IMSI (101), in order to determine whether the cloning is authorized. If the profile (101') indicates that the subscription of the subscriber allows cloning of the received template IMSI (101), the processing means (31) of the operator equipment (3) perform a step (50) for generating an IMSI clone (103) to which are assigned the IMEI (20) of the communicating object (2) and the template IMSI (101). This step consists of assigning (50) a clone (103) of the template IMSI (101) of the subscription subscriber to one of the virtual IMSIs (102) stored in the storage means (32) of operator equipment (3), and then associating the IMEI (20) of the authenticated communicating object (2) with this IMSI clone (103). If the subscribed services do not allow cloning, then a message, for example to refuse the cloning, Is sent by the operator equipment (3) to the mobile equipment (1), the application (110) of which for example signals to the subscription subscriber the need of subscribing to a complementary service. If the profile (101') has allowed the cloning, a message for confirming (51) the cloning, is sent by the operator equipment (3) to the mobile equipment (1). Upon receiving confirmation (51) of the cloning by the mobile equipment (1), the application (110) performs a copy (52) of the data (104) from the SIM card (10), then sends (53) these data (104) towards the application (210) executed on the processing means (21) of the communicating object (2) which performs the recording (54) of these data (104) into a volatile memory (222), for example of the RAM type (Random. Access Memory), in the storage means (22) of the communicating object (2). This step for recording (54) data (104) in the RAM memory (222) of the communicating object (2) is preceded by a possible step for deleting data possibly stored beforehand. As soon as these data (104) are recorded, the communicating object (2) is capable of using the profile (101') of the subscription subscriber, and the IMSI clone (103) which is assigned to it, will be identified by the authentication centers (321), by systematic synchronization of the databases (321, 322, 323) of the operator.

The method according to the invention also allows a step for updating the data relative to the IMSI clone (103) in the storage means (22) of the communicating object (2) of the subscription subscriber, in the case of a change in the profile (101') of the subscription subscriber. By systematic synchronization between the databases (321, 322, 323) of the operator, the database (323) automatically detects the need for an update. This update consists of writing new data into the storage means (22) of the communicating object (2), under the control of processing means (31) of operator equipment (3), following the standard steps for authenticating the communicating object (2) on the network (300) of the operator, when using communications authorized for the subscription of the subscriber. This writing may be performed by means of remote communication of the OTA® (Over The Air) technology type or of the local wireless link type, such as Bluetooth®. In another alternative embodiment, the step for updating the data relative to the IMSI clone (103) in the storage means (22) of the communicating object (2) of the subscription subscriber may also consist of writing new data into the storage means (22) of the communicating object, under the control of the processing means (11) of the mobile equipment (1) of the subscription subscriber, following a new step for mutual identification (40) between the mobile equipment (1) and the communicating object (2) initiated by the subscription subscriber.

It should be obvious for one skilled in the art that the present invention allows embodiments under many other specific forms without departing from the field of application of the invention as claimed. Therefore, the present embodiments should be considered as an illustration, but they may be changed in the field defined by the scope of the enclosed claims, and the invention should not be limited to the details given above.

The invention claimed is:

1. A method for secured duplication of at least part of the information from a SIM card to at least one communicating object which is in communication with a mobile equipment via a wireless local link, characterized in that it is implemented by a mobile equipment, at least one operator equipment and at least one communicating object, connected to each other via a wireless telephone network and/or via a wireless local link and in that it includes the following steps:

mutual identification between the mobile equipment and the communicating object, then sending, in an encrypted form, the IMEI serial number stored in storage means of the communicating object, by processing means of the communicating object, to processing means of the mobile equipment, received the IMEI of the communicating object by the mobile equipment, then sending, to the processing means of at least one operator equipment, by the processing means of the mobile equipment, a request for cloning a template IMSI associated with the SIM card of the mobile equipment, accompanied by the IMEI, in an encrypted form, of the communicating object to which the data should be assigned, received the cloning request by the processing means of the operator equipment, which perform, by consulting storage means of operator equipment, authentication of the received template IMSI and authentication of the IMEI of the communicating object.

2. The method according to claim 1, characterized in that, following the steps for authenticating the template IMSI of the mobile equipment and authenticating the encrypted IMEI of the communicating object, when at least one identifier, among IMSI and IMEI, is not authenticated, the processing means of the operator equipment perform a step for sending a message for refusing the cloning to the processing means of the mobile equipment which then suggest to the subscription subscriber, going back to the mutual identification step between the mobile equipment and the communication object.

3. The method according to claim 1, characterized in that, following the steps for authenticating the template IMSI of the mobile equipment and authenticating the encrypted IMEI of the communicating object, when IMSI and IMEI are both authenticated, the method continues with the following steps:

generating, in the storage means of operator equipment, an IMSI clone with which are associated the IMEI of the communicating object and the template IMSI corresponding to the SIM card of the mobile equipment, then sending, to the mobile equipment, an authorization for copying the data from its SIM card into storage means of the communicating object, receiving the authorization for copying the data by the mobile equipment, then copying and sending the data form the SIM card, by the processing means of the mobile equipment, to the processing means of the communicating object, received the data from the SIM card, by the processing means of the communicating object, then recording these data in storage means of the communicating object.

4. The method according to claim 1, characterized in that it includes a preliminary step for obtaining consent from the operator, consisting of recording, in the storage means of at least one operator equipment, a plurality of virtual IMSIs, waiting to be assigned to a subscription of a subscriber on the one hand, and, on the other hand, a plurality of IMEI serial nuntbers corresponding to communicating objects notified by the manufacturers of communicating objects, authorized by the operator, and a decryption key common to all the notified communicating objects, the step for authenticating the IMEI of the communicating object consisting of decrypting the received IMEI, by means of the stored decryption key, and comparing it with the plurality of IMEIs stored in the storage means of operator equipment, the step for generating an IMSI clone, with which are associated the IMEI of the communicating object and the template IMSI, consisting of authenticating the template IMSI by consulting an authentication center, followed by checking the subscription profile associated with the template IMSI for determining whether the cloning is authorized, then, if need be, by assigning one of the virtual IMSIs as a clone of the template IMSI of the subscription subscriber in the storage means of operator equipment, then associating the IMEI of the authenticated communicating object with this virtual IMSI which has become a clone.

5. The method according to claim 1, characterized in that at least certain steps of the method may be controlled by the subscription subscriber, by input and display means, present in the mobile equipment and in the communicating object, providing interactivity of the subscription subscriber with a software application executed on the processing means of the mobile equipment and of the communicating object in order to provide their interoperability.

6. The method according to claim 1, characterized in that the step for mutual identification between the mobile equipment and the communicating object is based on detection protocols between devices with wireless local link modules consisting of scanning the influence area of a master module for seeking slave modules and resulting in a detection of the communicating object by the mobile equipment, by respective wireless local link modules, in the slave and master modes, respectively, this detection being followed by sending, by the mobile equipment to the communicating object, a report request on the assignment status of the communicating object to a possible IMSI of a subscription subscriber.

7. The method according to claim 1, characterized in that, following the mutual identification step between the mobile equipment and the communicating object, when the communicating object is assigned to an IMSI clone which does not correspond to the template IMSI stored in the mobile equipment, the software application of the mobile equipment suggests going back to the mutual identification step between the mobile equipment and the communicating object, so as to prevent any change in this assignment from a mobile equipment which does not correspond to the template IMSI of the subscription subscriber to which the communicating object has been assigned beforehand.

8. The method according to claim 1, characterized in that, following the mutual identification step between the mobile equipment and the communicating object, when the communicating object is assigned to an IMSI clone corresponding to the template IMSI stored in the mobile equipment, the software application of the mobile equipment suggests a step for detaching the IMSI clone from the communicating object, allowing deletion in the storage means of the communicating object, of the data copied from the SIM card of the subscription subscriber.

9. The method according claim 1, characterized in that, following the mutual identification step between the mobile equipment and the communicating object, when the communicating object is not assigned to any template IMSI, the software application suggests a step for confirming the assignment of an IMSI clone to the communicating object, this confirmation resulting, if need be, in the sending by the mobile equipment of a request for transmitting the IMEI of the communicating object, followed by an answer from the communicating object which performs the sending, in an encrypted form, of the IMEI stored in its storage means, to the mobile equipment.

10. The method according claim 1, characterized in that the step for recording the data from the SIM card into the storage means of the communicating object is preceded by a possible step for deleting the data possibly stored in its storage means beforehand.

11. The method according to claim 1, characterized in that the steps for recording the data from the SIM card into the storage means of the communicating object and for assigning an IMSI clone to the communicating object, then allow the application of the standard steps for authenticating the communicating object on the network of the operator, for using the communications authorized by the subscription of the subscriber.

12. The method according to claim 1, characterized in that it also includes a step for updating the data relative to the IMSI clone in the storage means of the communicating object of the subscription subscriber, this updating consisting of, if need be, writing new data into the storage means of the communicating object, under the control of processing means of operator equipment, following the standard steps for authenticating the communicating object on the network of the operator, when using the communications authorized by the subscription of the subscriber.

13. The method according to claim 1, characterized in that the step for updating the data relative to the IMSI clone in the storage means of the communicating object of the subscription subscriber may also consist of writing new data into the storage means of the communicating object, under the control of the processing means of the mobile equipment of the subscription subscriber, following a new step for mutual identification between the mobile equipment and the communicating object, initiated by the subscription subscriber.

14. A system for secured duplication of information from a SIM card to at least one communicating object, comprising a mobile equipment, connected to at least one operator equipment via a wireless telephone network and at least one communicating object connected to the mobile equipment via a wireless local link, by the presence, in these devices, of wireless telephone communications modules and of wireless local link communications modules, characterized in that the mobile equipment and the communicating object including means for storing a software application and processing means executing this application, which allow their interoperability and their interactivity with a subscription subscriber, the processing means of the communicating object allowing, upon receiving of an IMEI request sent by the mobile equipment, the encryption of the IMEI stored in its storage means, by an encryption key stored in its storage means, and the encrypted sending of this IMEI to the processing means of the mobile equipment, these processing means of the mobile equipment further allowing association of the encrypted IMEI of the conununication object and of the template IMSI, stored in the SIM card of the mobile equipment, into a request for cloning the data from the SIM card and the sending of this cloning request to operator equipment.

15. The system according to claim 14, characterized in that at least one operator equipment includes storage means in which are stored in addition a plurality of IMEIs corresponding to communicating objects notified by the manufacturers of communicating objects and authorized by the operator, and a decryption key common to all the notified IMEIs, processing means of operator equipment allowing authentication of the IMEI of the communicating object, received from the mobile equipment requesting the cloning of the data of its SIM card on the one hand and, on the other hand, generation of an IMSI clone, corresponding to an assignment of a copy of the template IMSI of the mobile equipment to the communicating object, the IMEI of which has been received in association with the request for cloning the data of the SIM card of the mobile equipment.

16. The system according to claim 14, characterized in that the storage means of operator equipment include a plurality of virtual IMSIs, waiting to be assigned to a subscription of a subscriber, processing means of the operator equipment allowing generation of an IMSI clone, during a request for cloning the data of the SIM card of a mobile equipment, corresponding to a transformation of one of these virtual IMSI into an IMSI clone, copied from the template IMSI of the requesting mobile equipment, on the one hand and, on the other hand to an association of the IMEI of the communicating object assigned to the IMSI clone.

17. The system according to claim 14, characterized in that the processing means of the mobile equipment and of the communicating object authorize control of the storage means of the communicating object by the mobile equipment and allow the recording of a copy of the data from the SIM card of the mobile equipment into storage means of the communicating object.

18. The system according to claim 14, characterized in that processing means of operator equipment perform the checking of the integrity of the IMEI received from the mobile equipment requesting the cloning of the data of its SIM card in a communicating object identified by this IMEI, by decryption means of this received IMEI, by the decryption key stored in the storage means of operator equipment, on the one hand and, on the other hand, by means for comparing this decrypted IMEI with the plurality of IMEIs stored in the storage means of at least one operator equipment.

19. The system according to claim 14, characterized in that the processing means of at least one operator equipment include means for automatically performing the update of the data relative to the IMSI clone, in the case of a change in the data of the SIM card of the mobile equipment and means for directly recording the new data, via a wireless telephone network, into the storage means of the communicating object, by the processing means of the communicating object which authorize this recording.

20. The system according to claim 14, characterized in that the processing means of the mobile equipment include means for automatically performing the update of the data relative to the IMSI clone, in the case of a change in the data of the SIM card of the mobile equipment and means for directly recording the new data, via a wireless telephone network or via a wireless local link, into the storage means of the communicating object, by the processing means of the communicating object which authorize this recording.

21. The system according to claim 14, characterized in that the processing means of the communicating object to which an IMSI clone has been assigned, execute an application allowing the use of the subscription of the subscriber, from the data recorded in its storage means.

22. The system according to claim 14, characterized in that the plurality of IMEIs stored in the storage means of operator equipment is associated with information allowing the handling of the IMEIs of stolen or lost communicating objects and the processing means of at least one operator equipment forbid, if need be, any association of an IMEI notified as stolen or lost with an IMSI clone required by a mobile equipment.

23. The system according to claim 14, characterized in that the wireless local link communications modules present in the mobile equipment, the communicating object and operator equipment, are Bluetooth® transceiver modules.

24. The system according to claim 14, characterized in that the wireless telephone network communications modules, present in the mobile equipment, the communicating object and the operator equipment, are compatible with the GSM/DCS and UMTS networks.

* * * * *